United States Patent [19]

Gillilan

[11] Patent Number: 4,497,173
[45] Date of Patent: Feb. 5, 1985

[54] POWER TRANSDUCER SYSTEM

[76] Inventor: James Gillilan, 1807 W. College, Sherman, Tex. 75090

[21] Appl. No.: 596,649

[22] Filed: Apr. 4, 1984

[51] Int. Cl.³ .............................................. F03B 13/00
[52] U.S. Cl. ....................................... 60/495; 60/721; 417/337
[58] Field of Search .................. 60/495, 398, 721, 639, 60/640; 417/331, 332, 337

[56] References Cited

U.S. PATENT DOCUMENTS

| | | | |
|---|---|---|---|
| 429,392 | 6/1890 | Smyth | 60/640 |
| 467,072 | 1/1892 | White | 417/337 |
| 4,074,526 | 2/1978 | West | 60/495 X |

Primary Examiner—Stephen F. Husar
Attorney, Agent, or Firm—Thomas L. Cantrell; Stanley R. Moore

[57] ABSTRACT

Method of and apparatus for generating energy from a rocking float tank utilizing the buoyant force of water contained therein. The float tank is mounted to rock between first and second off center positions wherein the center of gravity of the water contained therein is shifted. A pair of flotation devices are mounted within the tank and forced upwardly by the buoyancy of the fluid volume therearound. The flotation devices are coupled to hydraulic cylinders or the like for transducing the energy resulting from the rocking flotation tank into a usable form. Rocking of the tank is effected through sequential shifting of ballast about the tank, ballast transfer being effected by compressed air in one particular embodiment.

20 Claims, 3 Drawing Figures

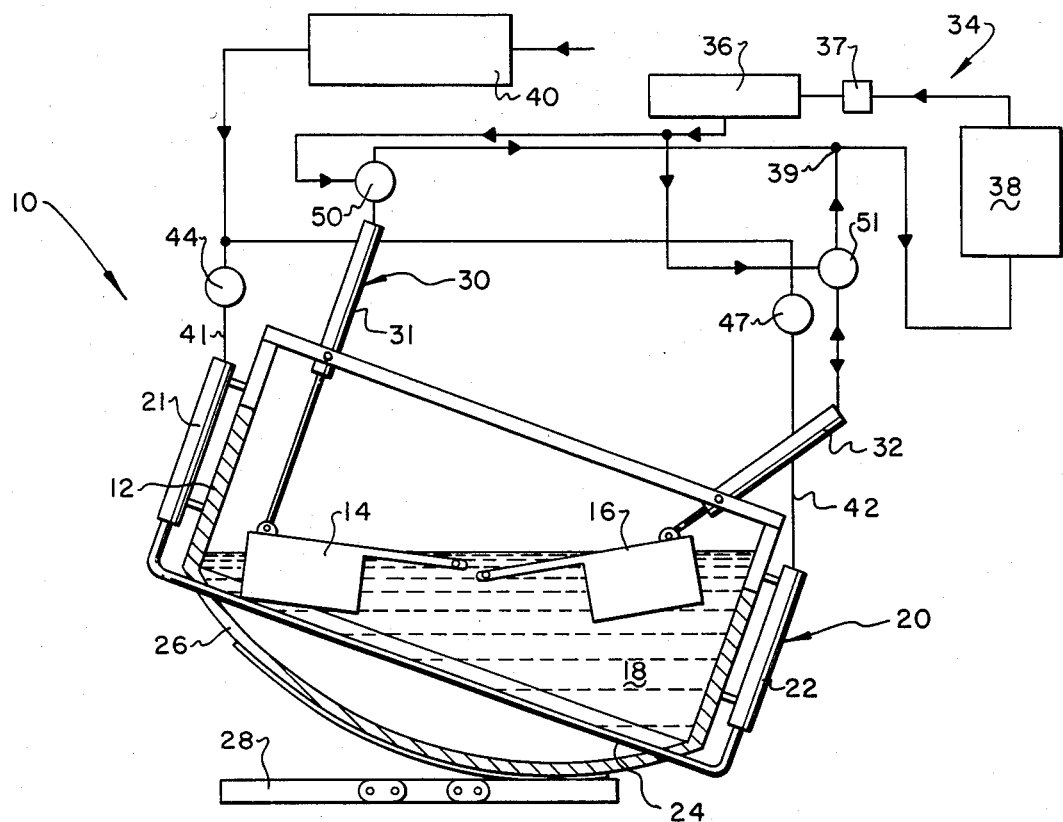
FIG. 1
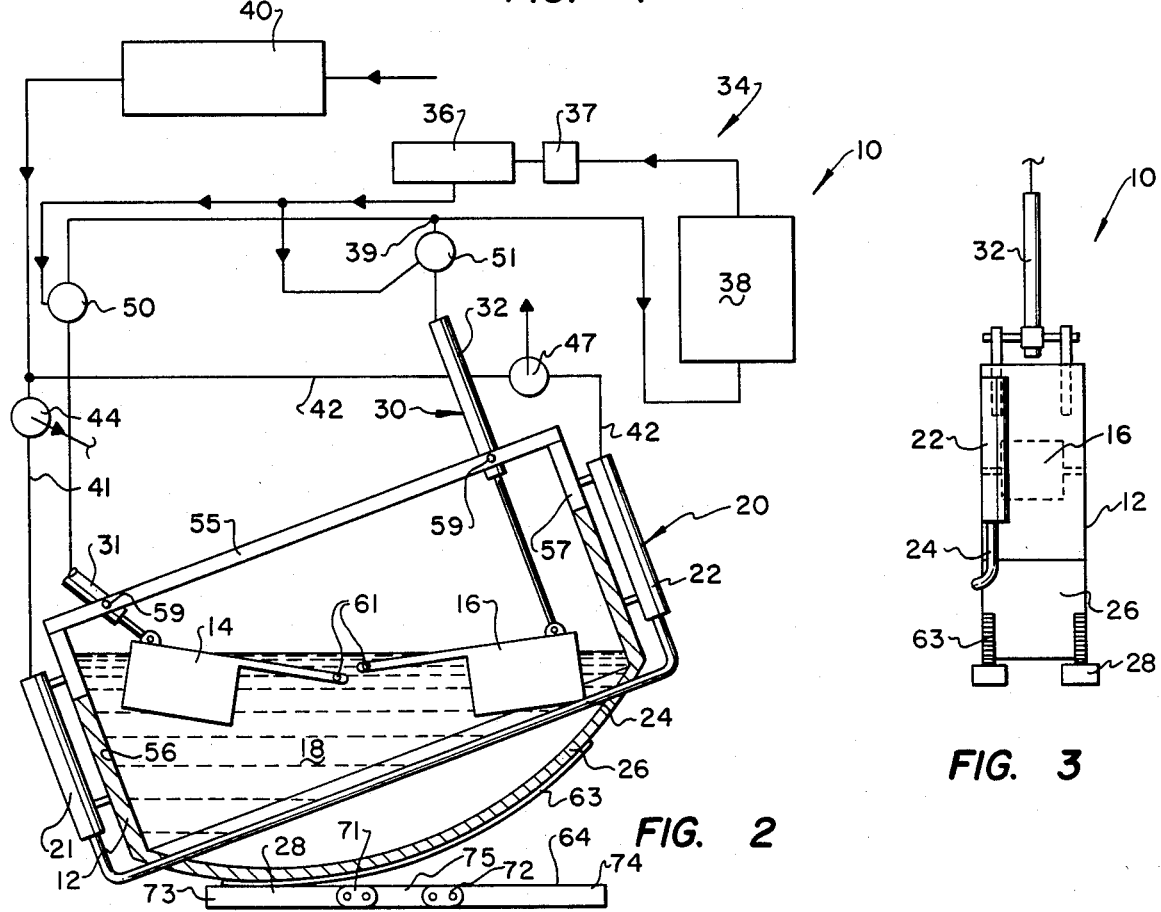
FIG. 2
FIG. 3

POWER TRANSDUCER SYSTEM

BACKGROUND OF THE INVENTION

1. Field of the Invention

The present invention relates to energy transducer systems and, more particularly, to method of and apparatus for converting energy through a pivotally mounted fluid filled vessel utilizing the buoyant force of the fluid contained therein.

2. History of the Prior Art

The prior art is replete with a myriad of apparatus utilizing water as a working or power fluid. The genesis of water powered systems extends into technological antiquity due in part, to the abundance of water on the planet and the ever growing need for more energy. Such systems include water wheels and more conventional water turbines.

More conventional applications of water power are manifested in numerous patents issued by the U.S. Patent and Trademark Office for water motors and the like. Certain ones of there patents address simply the weight characteristic of water in its liquid state, such as U.S. Pat. No. 556,391 issued to Wood. This 1896 reference utilizes the weight of water and its fluid nature for achieving an hydraulic motor. Water from a reservoir is sequentially vented into opposing collection troughs disposed on opposite ends of a pivotal beam. Sequential filling and emptying of the water from the reservoir into the troughs causes pivotal actuation and the generation or the transducing of energy from the rocking action thereof. In this manner a secondary fluid such as air or hydraulic fluid may be pumped by the motor for further utilization.

The oscillation of beams and water collection means disposed at opposite ends thereof is also set forth as shown in prior U.S. Pat. No. 927,789 issued to Broadwell in 1869, U.S. Pat. No. 223,930 issued to Lay in 1880, U.S. Pat. No. 429,392 to Smyth in 1890, U.S. Pat. No. 479,291 to Marsh in 1892, and U.S. Pat. No. 1,036,587 to Doyle et al in 1912. These prior art references each reflect certain new and useful improvements in water motors. For example, the Smyth patent utilizes not only the weight of the water but the buoyant characteristic thereof by utilizing a series of flotation elements for controlling the accumulation of the water within the vessel and the release thereof for flotation. In each of these cases it is the liquid weight of the fluid which effects the transfer of energy.

More conventional prior art applications of hydraulics to energy conversion systems are set forth as shown in U.S. Pat. No 3,803,847 to McAllister, U.S. Pat. No. 3,521,445 to Grable, U.S. Pat. No. 3,100,965 to Blackburn, and U.S. Pat. No. 4,086,765 to the inventor of the subject application. These references clearly show the advancement in technology affording new and multiple uses of liquid hydraulics and advances in systems incorporating same. For example, several of the aforesaid patents incorporate compressed air derived from a storage tank or the like to pressurize pumping or hydraulic chambers. These energy conversion systems have multiple uses including heating, cooling, and generating electrical or mechanical power. Similarly, many of these systems address the aspect of limiting the amount of fluid wasted in the cycling process to create a more energy conservative system. By utilizing compressed air, it is said that the pressure head of a more dense fluid such as water may be converted to an air pressure in not only a single but a plurality of vessels having a much greater volume than the original pressure generating volume. The potential energy in the form of air pressure may then be utilized to reduce the pressure across a compressed gas pumping system to reduce the power required for fluid recirculation.

While numerous aspects of fluid hydraulics in energy conversion have been tapped in the aforesaid prior art approaches, conventional technology has not fully addressed the buoyant characteristics of water in shifting or pivotal systems. For example, water contained within a vessel afforded the option of rocking about a center point will manifest a shift in the center of gravity of the system which may be utilized in the conversion of energy.

It would be an advantage therefore to utilize the inherent fluid characteristics of a mass such as water in a liquid state in association with a controlled shifting of its center of gravity. The methods and apparatus of the present invention provide such a system by utilizing low pressure air or the like to actuate a ballast network coupled to a rocking flotation vessel containing such fluid therein. Flotation elements disposed within the vessel are then buoyed by the contained fluid and the rocking of the vessel creates a shift in the fluid level relative to the respective flotation elements for the creation of differential flotation forces. By tapping this buoyancy differential manifested through the rocking of the vessel, an energy transducer system is provided.

SUMMARY OF THE INVENTION

The present invention relates to a energy conversion system for generating power through a shifting fluid mass contained within a vessel by the utilization of flotation elements disposed therein. More particularly one aspect of the present invention comprises an energy transducer system comprising a flotation tank and means supporting the flotation tank in first and second unbalanced positions. Means are provided for rocking the tank between the first and second positions. First and second flotation means are disposed within the tank and are adapted for floating upon fluid disposed within the tank which is shifted therein by the aforesaid rocking. Means are then coupled to the flotation means for actuation therewith in transducing energy from the shifting fluid level within said tank between the respective unbalanced positions.

In another aspect, the present invention comprises the aforesaid system wherein the energy transducing means includes first and second piston and cylinder assemblies coupled to the first and second flotation elements adapted for receiving the energy produced by the flotation element within the flotation tank during the shifting fluid level therein. The cylinder means comprises hydraulic cylinders adapted for the pumping of hydraulic fluid during the rise in water level commensurate with shifts of the water level during movement of the tank between the first and second positions. Ballast means are secured to the tank for imparting the rocking action between the unbalanced positions. The ballast means includes first and second upstanding ballast vessels disposed on opposite sides of the tank and means, such as compressed air, coupled to the first and second ballast vessels for alternating the relative fluid levels in each.

In another aspect the invention includes a method of transducing energy by shifting fluid levels within a containment vessel comprising the steps of mounting the containment vessel for first and second off-balance positions and providing means for imparting the first and second off-balance positions of the containment vessel. First and second flotation means are disposed within the containment vessels on opposite sides thereof. Means are then provided for absorbing power from the flotation elements within the flotation vessels in response to shifts of fluid level therein. The flotation elements are then coupled so the power absorbing means while the containment vessel is rocked between the first and second positions for the shifting of the fluid level therein. The rocking produces a sequential raising and lowering of the flotation elements within the fluid in response to variations of the fluid level during the shifting of the containment vessel.

In yet another aspect, the aforesaid invention includes the step of shifting the ballast means secured to the containment vessel for moving the center of gravity of the containment vessel. The step of shifting the ballast means includes the steps of providing first and second ballast tanks on opposite sides of the containment vessel, providing means for communicating the first and second ballast tanks, and driving fluid from opposite ones of the ballast tanks into the other for shifting the center of gravity of the containment vessel secured thereto. The step of shifting the ballast between the first and second ballast tanks includes the steps of providing compressed gas in flow communication with the ballast tanks and sequentially exposing the ballast tanks to the compressed gas for forcing the fluid in opposite ones thereof to the other through the flow communication means and the shifting of the center of gravity of the containment vessel.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a diagramatic schematic illustrating the methods and apparatus of the present invention in a first off-center rock position of the flotation tank;

FIG. 2 is a fragmentary, diagramatic schematic of the flotation tank in a second, opposite off-center position; and FIG. 3 is an end elevational view of the flotation tank of the present invention in an on-center position.

DETAILED DESCRIPTION

Referring first to FIG. 1 there is shown one embodiment of a system 10 incorporating the principles of the present invention and comprising a flotation vessel 12 having first and second flotation means 14 and 16 disposed therein. A volume of fluid such as water 18 is also contained within the vessel 12 and imparts a supporting buoyant force to the floats 14 and 16. Means are provided for shifting the center of gravity of the vessel 12 and includes a fluid ballast network 20 comprising a first ballast tank 21 and second, oppositely disposed ballast tank 22. The ballast tanks 21 and 22 are connected by a flow conduit 24 for the fluid communication therebetween. The tank 12 is further constructed with a curved bottom region 26 which is mounted upon a base plate 28 adapted for receiving and supporting the rocking action of the vessel 12. An energy coupling system 30 is connected to the vessel 12 and the floats 14 and 16 therein for transducing the rocking motion of said vessel through the buoyant force of the shifting fluid therein into hydraulic energy in a manner described in more detail below.

Still referring to FIG. 1, the energy coupling system 30 comprises first and second power cylinders 31 and 32, preferably of the hydraulic variety adapted for being driven by the floats 14 and 16 in response to variations of fluid level within the vessel 12. The hydraulic cylinders 31 and 32 are coupled together through power line network 34 constructed for supplying and utilizing the driven power fluid from cylinders 31 and 32. The power line network 34 includes a supply line system 35 and a drive system 39. A fluid accumulator 36 is shown coupled to the supply line system 35 for fluid storage. A fluid motor 37 is provided in flow communication with a fluid reservoir 38 which is coupled to cylinders 31 and 32 through the drive line system 39. It should be noted that other uses of the accumulated fluid may be selected in accordance with conventional hydraulic systems.

Referring now to FIG. 2, there is shown the vessel 12 in a second, off-balance position, having rocked to the opposite side of base plate 28 as compared to that of FIG. 1. It may also be seen that the flotation elements 14 and 16 have likewise moved as water level 17 has shifted relative to the opposite sides of the rocked vessel 12. Float 14 is thus shown in the upwardly displaced position in response to the buoyant force of the fluid 17 therebeneath. Hydraulic cylinder 31 has thus been actuated and fluid drive therefrom through system 39. The rocking process may itself be effected by appropriate ballast shifting means, and in the present invention, is effected by a compressed air source in flow communication with opposite ballast tanks 21 and 22.

Still referring to FIG. 2, a compressed air source 40 is coupled to ballast tank 21 through a flow line 41 and coupled to ballast tank 22 by flow line 42. A valve 44 positioned in line with ballast tank 21 is actuated to permit the compressed air from source 40 to drive fluid from ballast tank 21 into ballast tank 22 through conduit 24, coupling the tanks. Likewise supply line 42 is provided with a valve 47 for simultaneously venting ballast tank 22 during actuation of ballast tank 21. At the same time compressed air is shut off and prevented from flowing into ballast tank 22 from source 40 or through the vent of valve 47. In like fashion valve 44 of ballast tank 21 shifts into a similar venting mode relative to ballast tank 21 when valve 47 energizes valve tank 22 with compressed air from source 40.

Referring now to FIG. 3 there is shown an end elevational view of the vessel 12 of FIG. 1. The vessel 12 and the flotation element 16 are illustrated herein with a generally rectangular cross-sectional configuration. This is but one embodiment of possible constructions of said elements. The float 16 may of course, assume any appropriate shape necessary for buoyancy and maximum efficiency in operation. Likewise the vessel 12 maybe constructed with the curved, cylindrical bottom region 26 as shown in FIG. 3 or with a hemispherical surface for rolling (as compared to rocking) around a center axis in a continuous off-balance position in such a configuration; a plurality of flotation elements could be utilized for receiving the buoyant force of the fluid contained therein through changes in the fluid level during the rolling motion of the vessel 12. Likewise, a ballast network of modified design adapted for imparting a rolling action to the vessel 12 would be incorporated. Such a ballast design could, for example, include two additional ballast tanks each disposed 90° from the ballast tanks 21 and 22 for forming a quadrant array wherein each is sequentially actuated for shifting the fluid balance in a circular direction about the vessel 12. This circumferential shifting would cause rolling of the vessel 12 about a cylindrical bottom region with concomitant variations in relative water level around the vessel walls.

In operation, the transducer system 10 of the present invention is actuated by first providing a source for shifting ballast. In the embodiment presented in FIGS. 1-3, ballast shifting is effected between outwardly disposed ballast tanks 21 and 22 that are coupled to compressed air source 40. It should be noted that any compressed gas may be utilized as well as pressured fluid generated from windmills and the like. The utilization of the pressurized fluid such as air, to actuate the ballast system 20 requires the utilization of valves 44 and 47 as set forth above for purposes of pressurizing and venting respective ballast elements. In operation, the actuation of the aforesaid valve elements for the ballast system is effected simultaneously with the actuation of a valve network in the energy coupling system 30. A valve 50 is thus provided in flow communication with cylinder 31 for permitting flow from fluid accumulator 36 to cylinder 31 during the downstroke of float 14 as shown in FIG. 1. In such a mode, cylinder 31 is isolated from fluid reservoir 38 through valve 50. In like manner a valve 51 disposed in flow communication with cylinder 32 permits flow to fluid reservoir 38 therefrom while terminating communication with fluid accumulator 36. In the reverse stroke as shown in FIG. 2, valves 50 and 51 are actuated in opposite performance modes for permitting fluid to be driven from cylinder 31 to fluid reservoir 38 while fluid 32 is filled from fluid accumulator 36.

The operation of one embodiment the present invention is thus effected by simultaneous valve actuation between the ballast actuation fluid and the power drive fluid. By mounting the cylinders 31 and 32 directly to the vessel 12, all relative motion imparted by the position of flotation elements 14 and 16 upon the fluid 18 contained therein is absorbed by the cylinders 31 and 32. For this reason, a support strut 55 shown secured to side wall sections 56 and 57 of the vessel 12 for securing the relative interaction between the fluid level and the respective cylinders. Each cylinder 31 and 32 is pivotally mounted to the strut 55 through pivotal fastening means 59 to permit the necessary arcuate motion of the cylinders during the rotation of the flotation elements within the vessel. Likewise flotation elements 14 and 16 are pivotally mounted to the side walls of the vessel 12 by pivot mounts 61 to further permit the necessary interaction to be effectively absorbed by the respective cylinders 31 and 32 during changes is level of fluid 18.

As stated above the fluid of containment vessel 12 may be water or other sufficiently viscous liquid which will produce a buoyant force for supporting the flotation elements 14 and 16 and effecting the necessary shift of position relative to the rocking or rolling action of the vessel 12 as described above. To further secure the rocking or the rolling action of the vessel 12, the bottom portion 26 is preferably mounted with gear teeth, or a rack gear for mating engagement with a rack gear mounted in the base plate 28. As shown most clearly in FIG. 2 a curved gear 63 is illustrated to engage a planar mating gear section 64 secured to plate 28. In this manner the mesh of gear teeth prevents slippage of the vessel 12 relative to the base 28. The base 28 is also preferably hinged through hinge sections 71 and 72 as shown in FIG. 2 leaving a substantially horizontal base member 75. In this manner, the end sections 73 and 74 can be elevated and/or adjusted to "fine tune" the rocking latitude of the vessel 12 to maximize the efficiency of the ballast weight.

It may further be seen that the fluid supply power lines of FIGS. 1 and 2 are shown diagramatically. For example, lines 41 and 42 are shown simply as single lines in a schematic format. In construction of the present invention the necessary fluid coupling network could be provided in accordance with said diagram and conventional skills in pneumatic and hydraulic systems. All gas and fluid hoses attached to the vessel 12 are preferably flexible so as not to interfere with the movement of the vessel 12 during the rocking or rolling action.

It may thus be seen that the method and apparatus of the present invention will permit low pressure gas such as air to move a sufficient quantity of fluid, such as water, in a ballast system 20 to shift the center of gravity of a vessel 12 to impart rocking thereto. A shifting of the vessel 12 by 20° either side of its horizontal position will be effective in completing pressure strokes of cylinders 31 and 32 to drive a hydraulic system such as motor 37. It should also be noted that it is an important element of the present invention to provide fluid in the vessel 12 in relation to the base 28 wherein the vessel 12 is in a "near balance" condition at all times. The transferable ballast provides the necessary control to implement the off balance configurations presented in FIGS. 1 and 2 but such off-balance configurations are likewise susceptible to movement through shifting of fluid within the ballast system 20. In accordance herewith, a multiplicity of uses of the system may be appreciated wherein low pressure compressed air can be utilized to directly generate pressurized hydraulic fluid in an efficient and fluid transducer system.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. An energy transducer system comprising:
   a flotation tank having fluid disposed therein;
   means supporting said flotation tank in first and second unbalanced positions;
   means for rocking said tank between said first and second positions and shifting said fluid disposed therein;
   first and second flotation means disposed within said tank adapted for floating upon said fluid disposed within said tank; and
   means coupled to said flotation means for actuation therewith in transducing energy from shifting fluid level within said tank between said first and said second unbalanced positions.

2. The apparatus as set forth in claim 1 wherein said energy transducing means comprises first and second piston and cylinder assemblies coupled to said first and second flotation elements adapted for receiving the energy produced by said flotation element within said flotation tank during said shifting fluid level therein.

3. The apparatus as set forth in claim 2 wherein said cylinder means comprise hydraulic cylinders adapted for the pumping of hydraulic fluid during the rise in fluid level commensurate with shifts of said water level during movement of said tank between said first and second positions.

4. The apparatus as set forth in claim 1 wherein said rocking means comprises ballast means adapted for containing selective fluid levels therein and being secured to said tank for imparting said rocking motion thereto.

5. The apparatus as set forth in claim 4 wherein said ballast means includes first and second ballast vessels disposed on opposite sides of said tank and means coupling said first and second ballast vessels for alternating the relative fluid levels in each.

6. The apparatus as set forth in claim 5 and further including means for selectively varying the fluid level between said first and second ballast means through said coupling means therebetween for shifting said tank between said second and third positions.

7. The apparatus as set forth in claim 6 wherein said ballast shifting means includes compressed air in flow communication with said first and second ballast means and said tank fluid comprises water.

8. The apparatus as set forth in claim 1 wherein said tank is formed with a curved bottom section adapted for rocking in response to shifts in said fluid contained therein and said support means includes a base plate adapted for receiving and supporting said bottom section thereon.

9. The apparatus as set forth in claim 8 wherein said base plate is formed with lateral sections which are pivotally secured to a center section and adjustable relative thereto for defining the rocking movement of said tank thereon.

10. An method of transducing energy by shifting fluid levels within a containment vessel comprising the steps of:
   mounting said containment vessel for first and second off-balance positions;
   providing means for imparting said first and second off-balance positions to said containment vessel by the rocking thereof;
   disposing first and second flotation means within said containment vessels on opposite sides thereof and in positions responsive to shifts in fluid levels within said vessel;
   providing means for absorbing power from said flotation elements within said containment vessel in response to shifts of fluid level therein;
   coupling said flotation elements to said power absorbing means; and
   rocking said containment vessel between said first and said second positions for the shifting of said fluid levels therein and the sequential raising and lowering of said opposing flotation elements within said fluid in response to said variations of said fluid level during said rocking.

11. The method as set forth in claim 10 wherein said off-balance means includes fluid ballast means and the step of rocking said containment vessel includes the step of shifting fluid within said ballast means for moving the center of gravity of said containment vessel.

12. The method as set forth in claim 11 wherein said step of shifting said ballast means includes the steps of providing first and second ballast tanks on opposite sides of said containment vessel, providing pressure means in communication with said first and second ballast tanks, and driving water under pressure from opposite ones of said ballast tanks into the other for shifting the center of gravity of said containment vessel secured thereto.

13. The method as set forth in claim 12 wherein said step of shifting said ballast between said first and second ballast tanks includes the steps of providing compressed air in flow communication with said ballast tanks and sequentially exposing said ballast tanks to said compressed air for forcing the fluid in opposite ones thereof to the other through said flow communication means and the shifting of the center of gravity of said containment vessel.

14. An improved method of transducing energy through a water medium of the type wherein water is utilized to move at least two or more energy transducing elements and sequentially reversing directions, wherein the improvement comprises:
   providing a water containment vessel adapted for off-center positioning and the resultant variance of water level therein relative to the axis thereof;
   providing means for shifting the water containment vessel between first and second off-center positions;
   providing means for responding to the shift in water level exhibited within said containment vessel during said shift between said first and second positions;
   actuating said shifting means for moving said containment vessel between said first and second positions; and
   absorbing the energy produced by the rising water level on opposite sides of said containment vessel during said off-center positions thereof through the buoyant force of water contained therein and the position of said flotation means within said vessel.

15. The method as set forth in claim 14 wherein the step of providing said containment vessel adapted for off-center positioning includes the step of forming a curved bottom section upon said vessel for facilitating the off-center rocking thereof.

16. The method as set forth in claim 15 wherein said shifting means includes fluid ballast means and the step of shifting said containment vessel includes the step of shifting fluid within said ballast means for moving the center of gravity of said containment vessel.

17. The method as set forth in claim 16 wherein said step of shifting said ballast means includes the steps of providing first and second ballast tanks on opposite sides of said containment vessel, providing pressure means in communication with said first and second ballast tanks, and driving fluid under pressure from opposite ones of said ballast tanks into the other for shifting the center of gravity of said containment vessel secured thereto.

18. The method as set forth in claim 17 wherein said step of shifting said ballast between said first and second ballast tanks includes the steps of providing compressed air in flow communication with said ballast tanks and sequentially exposing said ballast tanks to said compressed air for forcing the fluid in opposite ones thereof to the other through said flow communication means and the shifting of the center of gravity of said containment vessel.

19. The method as set forth in claim 14 wherein said step of absorbing the energy produced by the rising water level on opposite sides of said containment vessel includes the step of providing a plurality of flotation elements within said vessel adapted for responding to shifts in the water level therein.

20. The method as set forth in claim 19 wherein the step of providing said flotation elements includes the step of providing energy transducing means responsive to motion of said flotation elements, securing said energy transducing means to said water containment vessel, and coupling said energy transducing means to said flotation elements for absorbing said energy produced by the rising water level from the shifting of said containment vessel between said first and second off-center positions.

* * * * *